(12) United States Patent
Mügge

(10) Patent No.: US 11,788,705 B2
(45) Date of Patent: Oct. 17, 2023

(54) ILLUMINATION DEVICE FOR VEHICLES HAVING A MATRIX ASSEMBLY FORMING A SUBAREA OF LINEAR LIGHT ASSEMBLY

(71) Applicant: Hella GmbH & Co. KGaA, Lippstadt (DE)

(72) Inventor: Martin Mügge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/816,553

(22) Filed: Aug. 1, 2022

(65) Prior Publication Data

US 2022/0364703 A1 Nov. 17, 2022

Related U.S. Application Data

(63) Continuation of application No. PCT/EP2021/051835, filed on Jan. 27, 2021.

(51) Int. Cl.
| | | |
|---|---|---|
| *F21S 43/14* | (2018.01) | |
| *F21S 43/237* | (2018.01) | |
| *B60Q 1/00* | (2006.01) | |
| *B60Q 1/26* | (2006.01) | |
| B60Q 1/30 | (2006.01) | |
| B60Q 1/44 | (2006.01) | |

(52) U.S. Cl.
CPC ............ *F21S 43/14* (2018.01); *B60Q 1/0041* (2013.01); *B60Q 1/2607* (2013.01); *F21S 43/237* (2018.01); B60Q 1/30 (2013.01); B60Q 1/44 (2013.01)

(58) Field of Classification Search
CPC ........ F21S 43/14; F21S 43/145; F21S 43/237; F21Y 2105/10; F21Y 2103/10
See application file for complete search history.

(56) References Cited

U.S. PATENT DOCUMENTS

| | | | |
|---|---|---|---|
| 8,292,480 B2 * | 10/2012 | Koizumi | B60Q 1/2607 |
| | | | 362/519 |
| 11,231,157 B2 * | 1/2022 | Siakos | B60Q 1/2607 |

FOREIGN PATENT DOCUMENTS

| | | |
|---|---|---|
| CN | 104842866 A | 8/2015 |
| DE | 102011050738 A1 | 12/2012 |
| DE | 102012004759 A1 | 9/2013 |
| DE | 102014110348 A1 | 1/2016 |
| DE | 102017202246 A1 | 8/2018 |
| DE | 102017116344 A1 | 1/2019 |
| KR | 1020130133473 A | 12/2013 |
| KR | 1020140079932 A | 6/2014 |
| KR | 1020160044844 A | 4/2016 |
| WO | 2017071945 A1 | 5/2017 |

* cited by examiner

*Primary Examiner* — Robert J May
(74) *Attorney, Agent, or Firm* — Husch Blackwell LLP

(57) ABSTRACT

An illumination device is provided for vehicles, the illumination device including a matrix assembly containing a number of lighting elements arranged in the form of a matrix, each of which can be actuated individually and independently of each other. A line assembly is provided for with a number of light sources and a lens unit for generating a linear signal light function. The matrix assembly is at least partially a component of the line assembly. One part of the matrix assembly forms one part of the linear assembly.

10 Claims, 2 Drawing Sheets ically. According to a refinement of the invention, the first
ILLUMINATION DEVICE FOR VEHICLES HAVING A MATRIX ASSEMBLY FORMING A SUBAREA OF LINEAR LIGHT ASSEMBLY

CROSS REFERENCE

This application is a continuation of a claims priority to PCT Application No. PCT/EP2021/051835, filed Jan. 27, 2021, which itself claims priority to German Application No. 10 2020 102555.6, filed Feb. 3, 2020, the entireties of both of which is hereby incorporated by reference.

FIELD OF THE INVENTION

The invention relates to an illumination device for vehicles with a matrix assembly containing a number of lighting elements arranged in the form of a matrix that can in each case be actuated individually and independently of each other.

BACKGROUND OF THE INVENTION

An illuminating device for vehicles with a matrix assembly that features a plurality of lighting elements arranged in the form of a matrix is known from DE 10 2012 004 759 A1. The lighting elements can be actuated individually and independently of each other in such a way that different signal light functions, for example tail light, stop light, etc. or information light patterns, for example an arrow or other symbols, can be generated. One disadvantage of the known illumination device is that either the signal light function or the information light pattern can be generated.

An illuminating device for vehicles that features a plurality of lighting elements arranged in the form of a matrix is known from WO 2017/071945 A1. The large number of lighting elements arranged on each surface make it possible to generate different signal light functions by actuating the corresponding lighting elements. The known illumination device serves to generate a specified signal light function, where the signal light function can feature a different light pattern.

BRIEF SUMMARY OF THE INVENTION

The task of the present invention is to further develop an illumination device for vehicles in such a way the variability in the provision of light patterns is increased in a simple manner.

To solve this task, a line assembly is provided for with a number of light sources and a lens unit for generating a linear signal light function, in that the matrix assembly is at least partially a component of the line assembly, where one part of the matrix assembly forms one part of the line assembly.

According to the invention, at least two assemblies are provided for, namely firstly a line assembly by means of which a linear signal light function is generated. Secondly, a matrix assembly is provided for by means of which different information light patterns can be generated. According to the invention, it is specified that a subarea of the matrix assembly forms a subarea of the line assembly in such a way that there is a direct spatial connection between the line assembly and the matrix assembly. This means that the spatial arrangement of the two assemblies to each other brings about a functional link between a signal light function and an information function.

According to a preferred embodiment of the invention, the lighting elements arranged in the subarea of the matrix assembly that spatially correspond to the subarea of the line assembly with regard to luminance and color are actuated in such a way that they correspond with the luminance and color of the ends of the line assembly facing the subarea of the matrix assembly. The subarea of the matrix assembly thus forms an extension or bridging of a further subarea of the line assembly that is arranged as an extension of the matrix assembly. As an advantage, the line assembly can, for example, be used to generate a stop light function as a signal light function while the matrix assembly is used to generate an information text "stop" or "traffic jam" as an information light pattern, which additionally indicates to other road users the actual signal light function of the line assembly or a particular traffic situation. As an advantage, this provides a spatial and functional amplification of the signal light function for the other road users.

According to a preferential embodiment of the invention, a first subarea of the matrix assembly is provided for that generates the light function specified by the line assembly. Whenever the line assembly is switched on, the first subarea of the matrix assembly is also switched on. A second subarea of the matrix assembly serves as a display surface for generating the specified information light pattern that can be switched on and off independently of the light function (signal light function) generated by the line assembly. As an advantage, this makes it possible to generate, on the one hand, light functions arranged spatially close to each other and information light functions, on the other.

According to a refinement of the invention, the first subarea of the matrix assembly takes the form of a linear shape, where the linear subarea can run in a straight line in at least one subsection and connect at its two ends to an end of the line assembly in each case. The first subarea of the matrix assembly thus closes a gap between ends of the line assembly or forms an extension of the same when connected to a free end of the line assembly.

In accordance with a refinement of the invention, the first subarea of the matrix assembly forms an edge of the matrix assembly in such a way that a flat display function for generating information light patterns connects directly to the linear light function of the line assembly.

According to a refinement of the invention, the first subarea of the matrix assembly allocated to the subarea of the line assembly, where a carrier surface of the first subarea of the matrix assembly covers the subarea of the line assembly in such a way that exclusively light from the first subarea of the matrix assembly, and not from the subarea of the line assembly to be replaced, is generated. As an alternative, the line assembly can also feature a gap or an empty space that is filled by the first subarea of the matrix assembly. It is advantageous that this makes it possible to reduce the installation depth.

According to a refinement of the invention, the matrix assembly takes the form of an LED display, OLED display or a liquid crystal display with backlighting unit. The design of the matrix assembly differs in principle from the design of the line assembly that can feature, for example, a light guide with light incoupling on the front side or long side or a linear sequence of lens optics, TIR optics or reflectors with a lens located in front. As an advantage, the matrix assembly can be actuated in such a way that the luminance is higher in the display of the information function than the luminance of the line assembly. As an advantage, the display of, as an example, warning signals by the matrix assembly can perform a more conspicuous display that would be possible with a single assembly and for future autonomous driving vehicles an additional information surface is available for communication with other road users or pedestrians.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

An inventive illumination device for vehicles can be arranged in a front or rear area of the vehicle, where two light patterns are generated; firstly, a signal light function and, secondly, an information light function. A line assembly 1, that features a number of light sources and a lens unit, serves to generate the signal light function, for example tail light, stop light, etc. For example, the line assembly features a linear light guide 2 into a front side of which light from a light source is incoupled. As an alternative, light can be incoupled along a long side of the light guide 2, where a plurality of light sources and reflectors and/or lenses allocated to the same on the long side are allocated.

Furthermore, a matrix assembly 3 is provided for featuring a plurality of lighting elements 4 arranged in the form of a matrix. The lighting elements 4 are arranged in the shape of rows and columns and preferentially designed in a uniform manner. The matrix assembly 3 can, for example, take the form of an LED display, OLED display or a liquid crystal display with a backlighting unit. The lighting elements 4 can be actuated individually and independently of each other.

Figure 1:
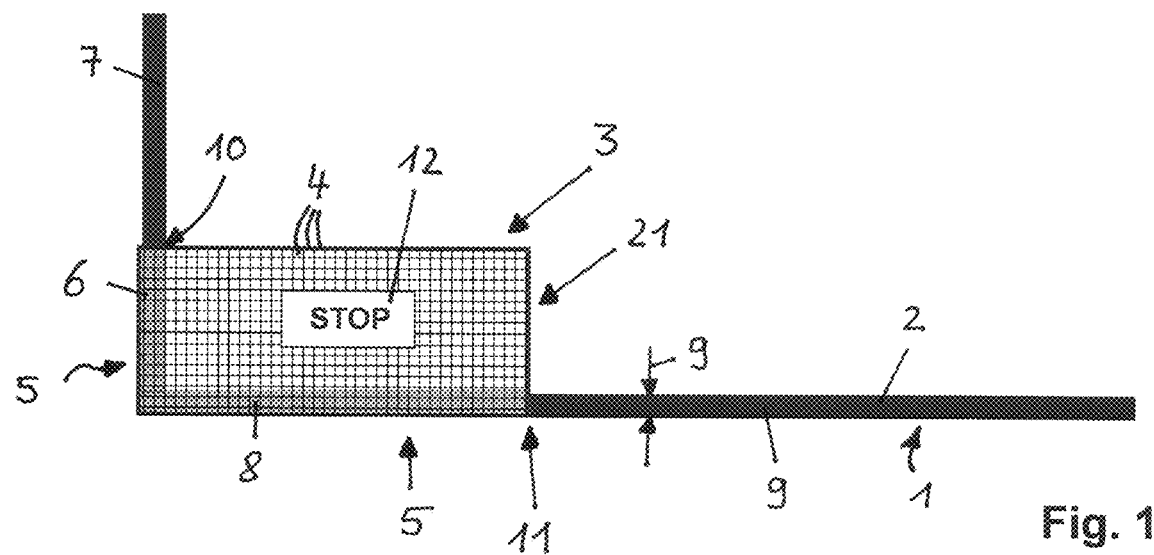
FIG. 1 is a schematic front view of a light pattern generated by an illumination device in accordance with a first embodiment.

According to a first embodiment of the invention in accordance with FIG. 1, the line assembly 1 is designed in the shape of an L. The matrix assembly 3 takes the form of a rectangle, where a first subarea 5 or the matrix assembly 3 forms a subarea of the line assembly 1. The matrix assembly 3 is arranged in a corner area of the line assembly 1, where a short edge section 6 of the matrix assembly 3 runs as an extension of a first line assembly 7 and a second edge section 8 of the matrix assembly 3 as an extension of a second line section 9 of the line assembly 1. The first edge section 6 and the second edge section 8 of the matrix assembly 3 form a corner area of the line assembly 1. The first edge section 6 and the second edge section 8 of the matrix assembly 3 feature the same crosswise extension q as the crosswise extension q of the first and second line section 7, 9. The first edge section 6 and the second edge section 8 thus fill a gap between one end 10 of the first line section 7 and an end 11 of the second line section 9.

If the line assembly 1 is actuated by switching on the corresponding light source, the matrix assembly 3 is actuated at the same time in such a way that the first edge section 6 and the second edge section 8 of the matrix assembly 3 emit light, specifically with such luminance and color that corresponds to the luminance and the color of line section 7, 9 of the line assembly 1. To this end, a luminance and/or color calibration of the corresponding lighting elements 4 in the edge sections 6, 8 is performed depending on the corresponding color and/or luminance values of the line assembly 1.

The matrix assembly 3 can be actuated independently of the line assembly 1. For example, the matrix assembly 3 can be actuated at the same time as the line assembly 1 in such a way that a second part 21 of the matrix assembly 3 as an information light function is displayed as an information light pattern 12 in the form of the word "stop". This offers additional information on the function of the switched-on line assembly 1.

As an alternative, the matrix assembly 3 can also be actuated independently of the line assembly 1 for generating information for the other road users, for example using an arrow-shaped information reading pattern or the like.

To make it possible to see in FIG. 1 that the edge sections 6, 8 of the matrix assembly 3 run as an extension of line sections 7, 9, the edge sections 6, 8 are marked in gray.

It can be seen that the first edge section 6 and the second edge section 8 are allocated to the matrix assembly 3 in a straight line. They extend in the shape of an L between the ends 10 and 11 of the line assembly 1.

The matrix assembly 3 can be arranged in a gap present between the ends 10, 11 of the line assembly 1. As an alternative, the matrix assembly 3 can also be arranged physically on the non-visible subarea of the line assembly 1, the function of which it assumes.

Figure 2:
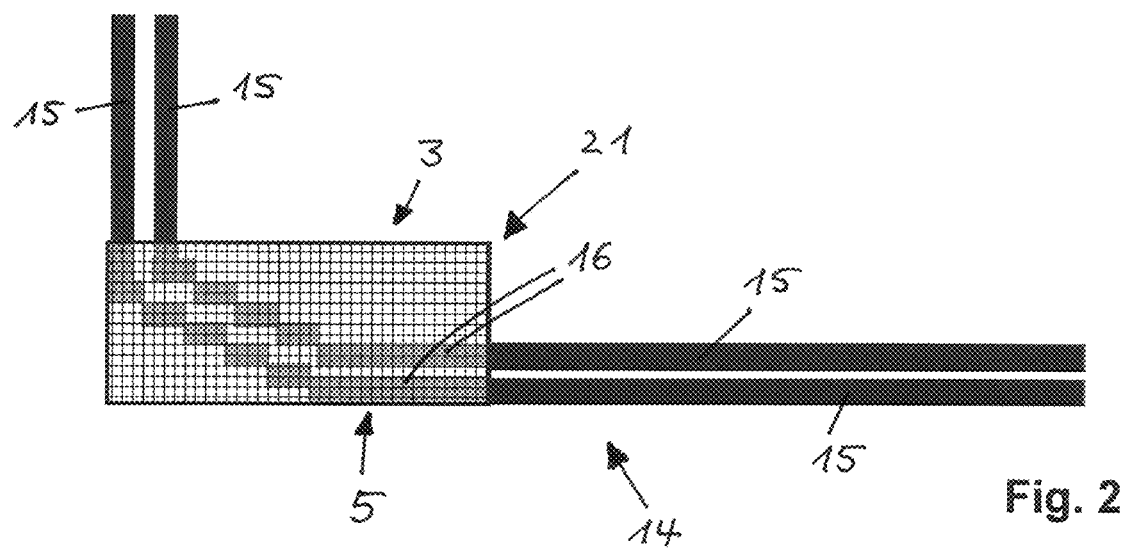
FIG. 2 is a schematic front view of a light pattern generated by the illumination device in accordance with a second embodiment.

According to a further embodiment of the invention in accordance with FIG. 2, a line assembly 14 with two light guides 15 running parallel to each other can be provided for. As in accordance with the embodiment according to FIG. 1, the matrix assembly 3 is arranged in the corner area, where subarea 5 of the matrix assembly 3 comprises two parallel line sections 16.

Figure 3:
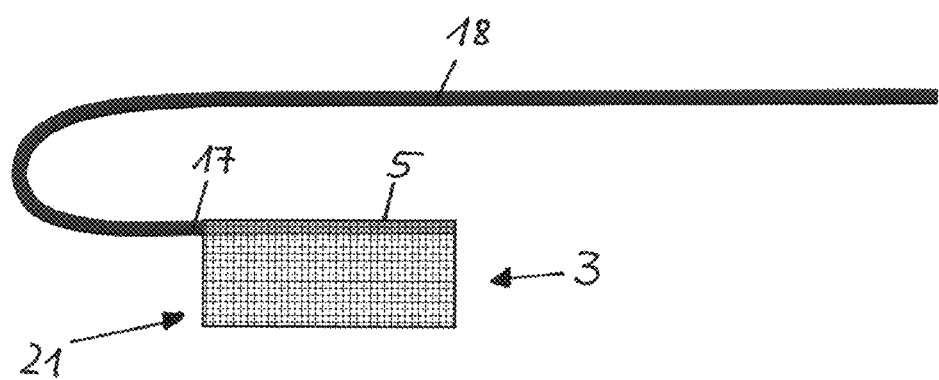
FIG. 3 is a schematic front view of a light pattern generated by the illumination device in accordance with a third embodiment.

According to a further embodiment of the invention in accordance with FIG. 3, the matrix assembly 3 can also connect to one end 17 of an arched line assembly 18.

Figure 4:
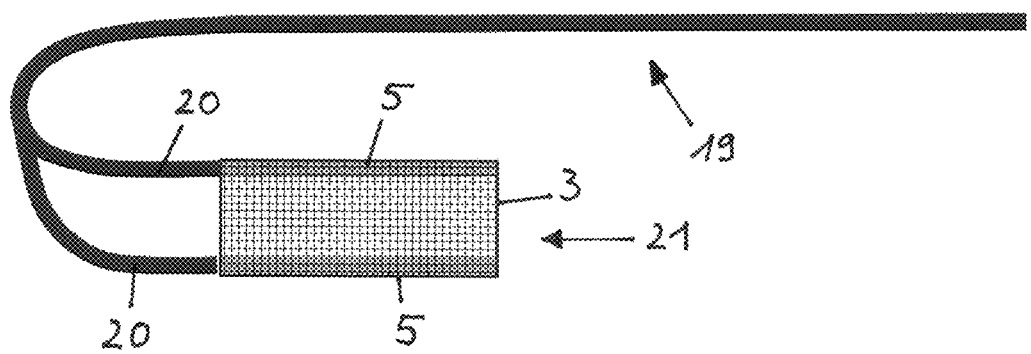
FIG. 4 is a schematic front view of a light pattern generated by the illumination device in accordance with a fourth embodiment.

According to FIG. 4, a linear assembly 19 can be provided for that features two branching arms 20. The subarea 5 of the matrix assembly 3 extends as an extension of the arms 20, where the matrix assembly 3 extends between its subareas 5.

Figure 5:
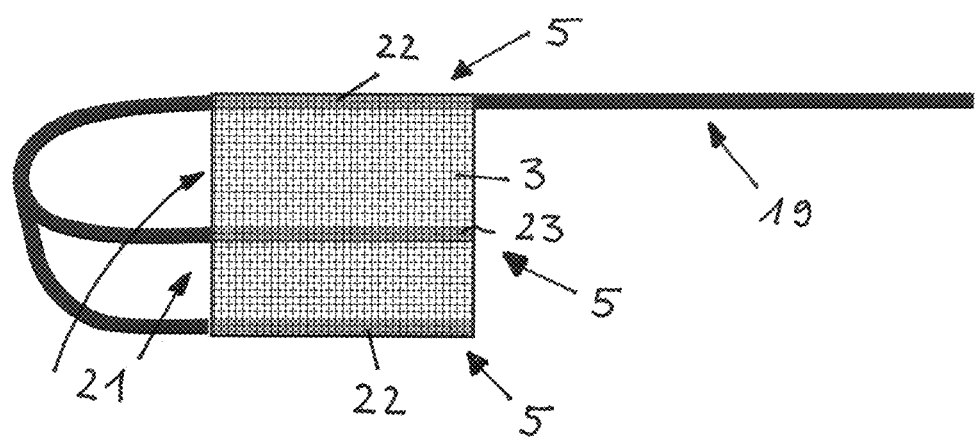
FIG. 5 is a schematic front view of a light pattern generated by the illumination device in accordance with a fifth embodiment.

According to a further embodiment of the invention in accordance with FIG. 5, the matrix assembly 3 can also extend over the entire width of the line assembly 19, where the subarea 5 of the matrix assembly 3 is formed by edge sections 22 and a central section 23.

Figure 6:
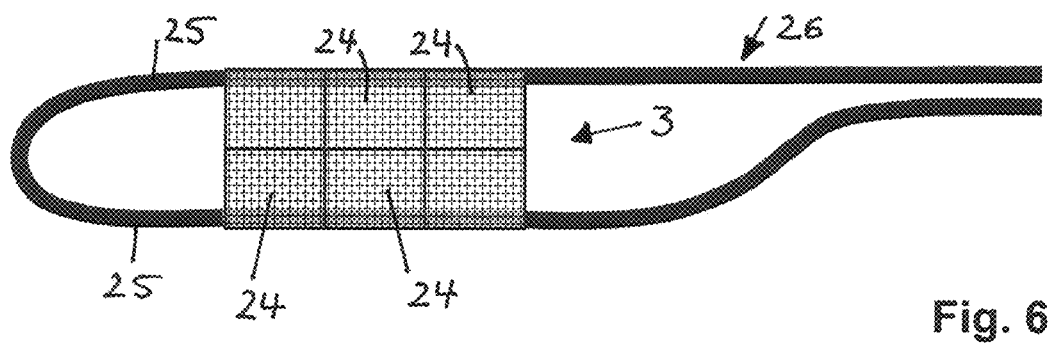
FIG. 6 is a schematic front view of a light pattern generated by the illumination device in accordance with a first embodiment.

According to a further embodiment of the invention in accordance with FIG. 6, the matrix assembly 3 cannot be formed by a single display but by several displays 24 that extend, for example, between two legs 25 of a line assembly 26. As an alternative, the plurality of the small displays can be staggered as steps in depth.

Figure 7:
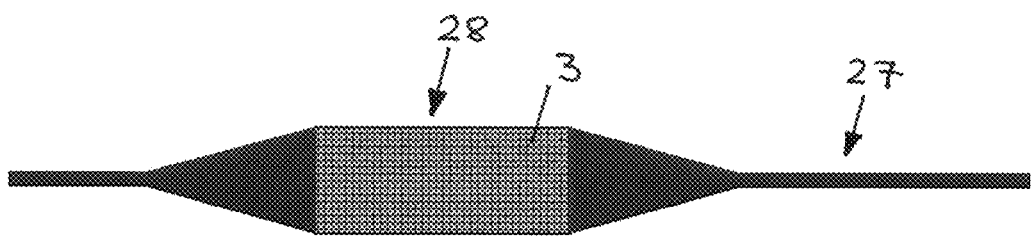
FIG. 7 is a schematic front view of a light pattern generated by the illumination device in accordance with a seventh embodiment.

According to a further embodiment of the invention in accordance with FIG. 7, a subarea of the line assembly 27 can be completely filled by the matrix assembly 3, where in the present sample embodiment the line assembly 27 features light guide sections of different widths. The matrix assembly 3 is arranged in a wide light guide section 28.

In an embodiment of the invention that is not shown, the line assembly 1 can feature a lens band or a reflector band with a lens.

It should be noted that the same components or component functions have been given the same reference numbers.

LIST OF REFERENCE NUMBERS

1 Line assembly
2 Light guide
3 Matrix assembly
4 Lighting element
5 Subarea
6 First edge section
7 First line section
8 Second edge section
9 Second line section
10 End
11 End
12 Word stop
14 Line assembly
15 Light guide
16 Line section
17 End
18 Line assembly
19 Linear assembly
20 Arms
21 Subarea
22 Edge section
23 Central section
24 Display
25 Leg
26 Line assembly
27 Line assembly
28 Light guide section
q Crosswise extension

I claim:

1. An illumination device for vehicles, the illumination device comprising:
   a matrix assembly containing lighting elements arranged in a matrix, wherein each said lighting element can be actuated individually and independently of each other said lighting element,
   a line assembly including light sources and a lens unit for generating a linear signal light function,
   wherein the matrix assembly is at least partially a component of the line assembly,
   wherein a subarea of the matrix assembly forms one subarea of the line assembly,
   wherein the matrix assembly generates an information function that is functionally linked to the linear signal light function generated by the line assembly.

2. The illumination device in accordance with claim 1, wherein the lighting elements arranged in the subarea of the matrix assembly are actuated in such a way that the luminance and color of one end of the subarea of the matrix assembly corresponds to the luminance and color of an end of the line assembly adjoining the end of the subarea of the matrix assembly.

3. The illumination device in accordance with claim 1, wherein a first subarea of the matrix assembly forms the subarea of the line assembly for generating a specified signal light function that is specified by the line assembly, and
   wherein a second subarea of the matrix assembly forms a display surface for generating a specified information light function.

4. The illumination device in accordance with claim 3, wherein the first subarea of the matrix assembly has a linear shape and extends between a first end and a second end of the line assembly, or connects exclusively to a free end of the line assembly.

5. The illumination device in accordance with claim 4, wherein the first subarea of the matrix assembly or the entire matrix assembly runs between two ends of the line assembly.

6. The illumination device in accordance with claim 3, wherein the first subarea of the matrix assembly forms one edge of the matrix assembly.

7. The illumination device in accordance with claim 3, wherein the first subarea of the matrix assembly is arranged in a gap in the line assembly or on the subarea of the line assembly.

8. The illumination device in accordance with claim 1, wherein the matrix assembly is an LED display or an OLED display or a liquid crystal display with a backlighting unit.

9. The illumination device in accordance with claim 1, wherein the matrix assembly is a single-part display or is formed by a plurality of small displays arranged in one plane or staggered as steps in depth.

10. The illumination device in accordance with claim 1, wherein the line assembly features a light guide with light in-coupling on the front, or a light guide with the light incoupling arranged on a long side of the same, or a lens band or reflector band with a lens.

* * * * *